Jan. 9, 1940.                L. NEUBERGER              2,186,807
                        METHOD OF TOASTING BREAD
                 Filed June 30, 1937           3 Sheets-Sheet 1
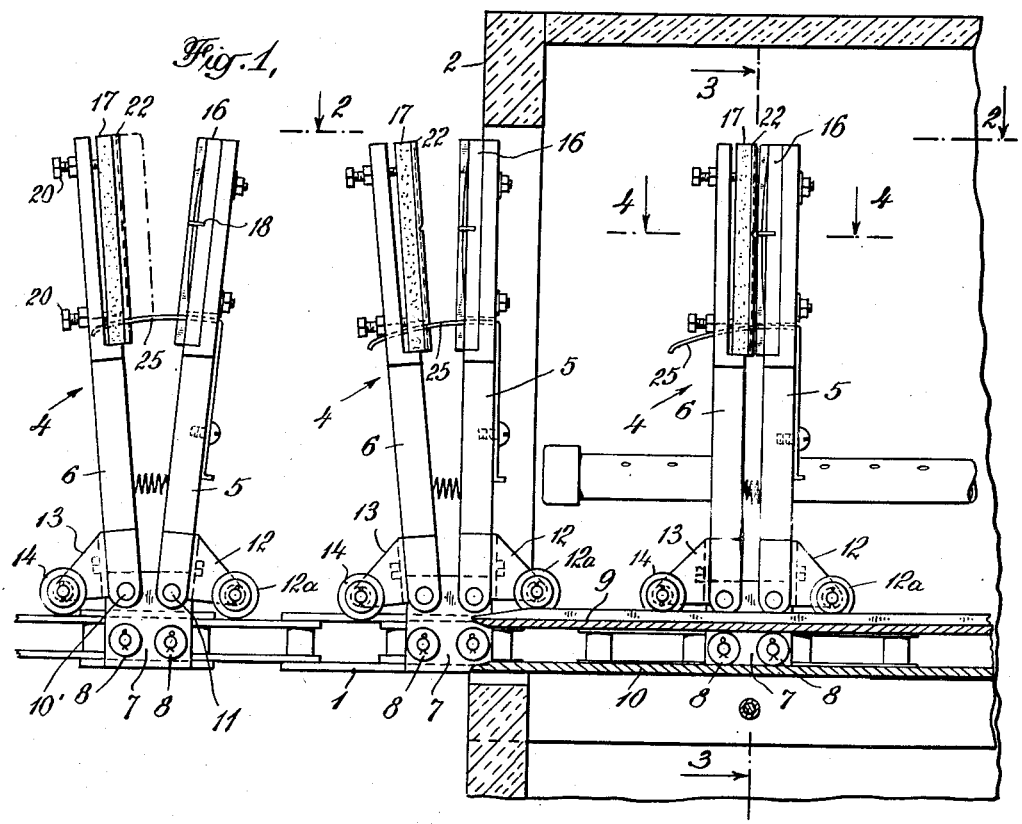
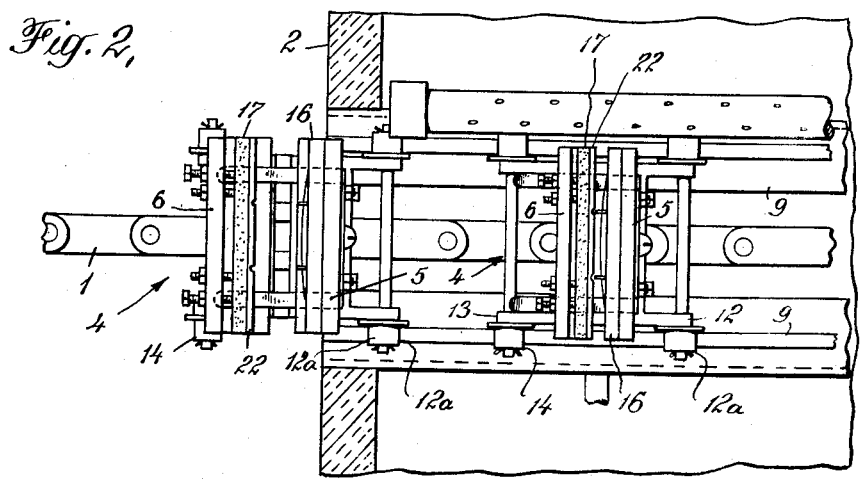
INVENTOR
Lester Neuberger
BY
Pennie Davis Marvin & Edmonds
his ATTORNEYS Jan. 9, 1940.                L. NEUBERGER                 2,186,807
                        METHOD OF TOASTING BREAD
                        Filed June 30, 1937           3 Sheets-Sheet 2
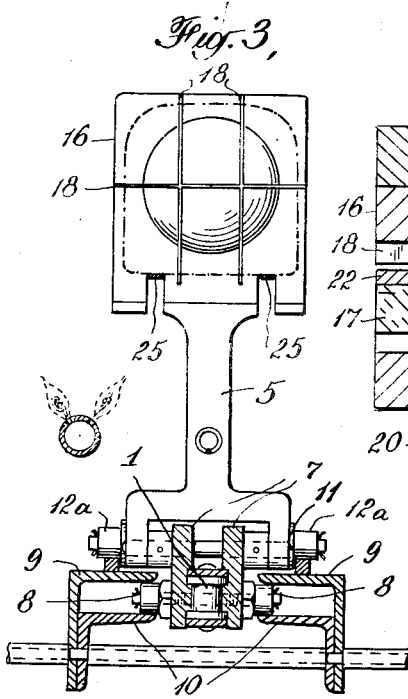
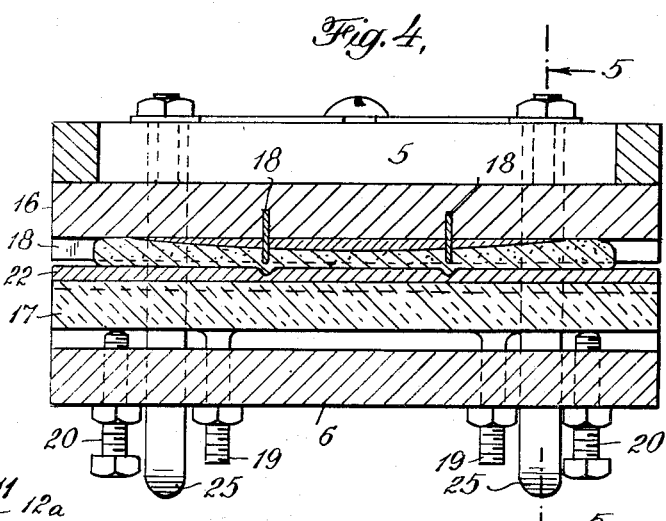
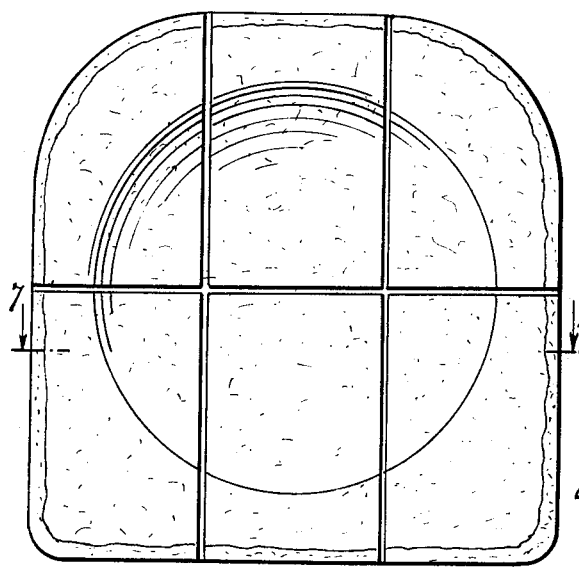
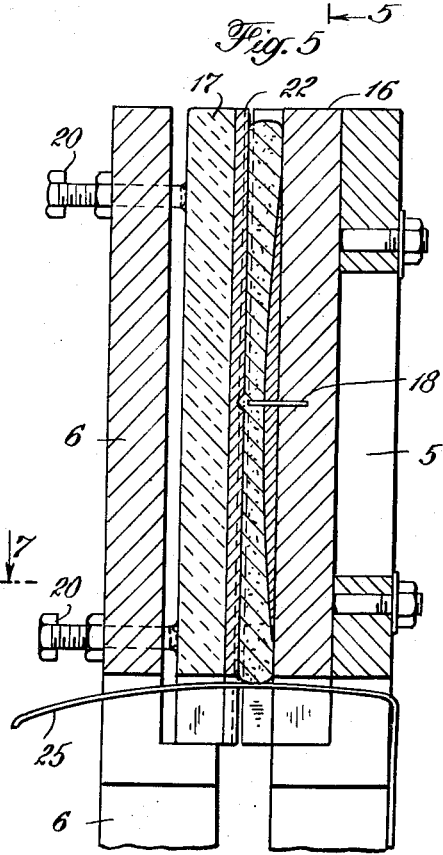
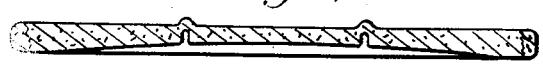
INVENTOR
Lester Neuberger
BY
Pennie Davis Marvin & Edmonds
his ATTORNEYS Jan. 9, 1940.   L. NEUBERGER   2,186,807
METHOD OF TOASTING BREAD
Filed June 30, 1937   3 Sheets-Sheet 3

INVENTOR
Lester Neuberger
BY
Pennie, Davis, Marvin & Edmonds
his ATTORNEYS

Patented Jan. 9, 1940

2,186,807

UNITED STATES PATENT OFFICE

2,186,807

METHOD OF TOASTING BREAD

Lester Neuberger, New York, N. Y., assignor to Ward Baking Company, New York, N. Y., a corporation of New York Application June 30, 1937, Serial No. 151,317

1 Claim. (Cl. 99—86)

This invention relates to toasted bread products and method of making the same, and has for its object to provide a new food product and a method of making the same from sliced baker's bread.

As is well known, sliced bread has practically superseded unsliced bread with the purchasing public. That is to say, the bread which is sold by the large baking establishments to retail stores for sale to the householder for home consumption is practically all sold as sliced bread, and as most reliable baking establishments take back from the retail stores all unsold bread before it has time to grow stale, there is a substantial percentage of the total bakery output of sliced bread which must be disposed of otherwise than through the usual retail channels. This returned bread results in a very substantial loss to the bakers, which loss, of course, has to be made up by placing an initial price on the bread greater than otherwise would be necessary.

It has heretofore been proposed to toast the returned sliced bread, but all such products heretofore placed on the market have not been salable as compared with toast prepared directly as such for the market. The improved toast product is toasted through and through, and to this end resembles the so-called Zweiback. Instead, however, of being a light, porous toast such as Zweiback, it is compressed to a density several times that of sliced bread. The new toast has a consistency almost equal to that of so-called water crackers, and at the same time has a taste resembling that of Melba toast as customarily prepared by toasting slices of bread cut originally to substantially the desired thickness of the toasted product.

The new product is also unique in the way in which it is scored to insure breaking along defined lines. In products of this kind as previously produced, the scoring of the bread before or in the process of toasting has not greatly facilitated the breaking of the toast into smaller pieces of definite shape. The toasted slice of bread constituting the improved product of this application can invariably be broken along the score-lines. The toast is not, however, rendered fragile thereby, but on the contrary, my improved toasted bread product shows less breakage in shipment than any similar products now on the market.

In order to give a better understanding of the improved toasted bread product and the method of making the same, I have illustrated diagrammatically in the accompanying drawings the working parts of a machine for producing my product, and in the appended specification I will describe such machine and the manner in which it is manipulated in carrying out my improved process.

Referring to the drawings,

Fig. 1 is a side elevation, partly in section, of the carrier in which the sliced bread is held during the toasting operation;

Fig. 2 is a plan view partly in section on line 2—2 of Fig. 1;

Fig. 3 is a vertical transverse section on line 3—3 of Fig. 1;

Fig. 4 is an enlarged detail section on line 4—4 of Fig. 1;

Fig. 5 is an enlarged vertical section on line 5—5 of Fig. 4;

Fig. 6 is an elevational view of the toasted bread product;

Fig. 7 is a sectional view on line 7—7 of Fig. 6; and

Figure 8:
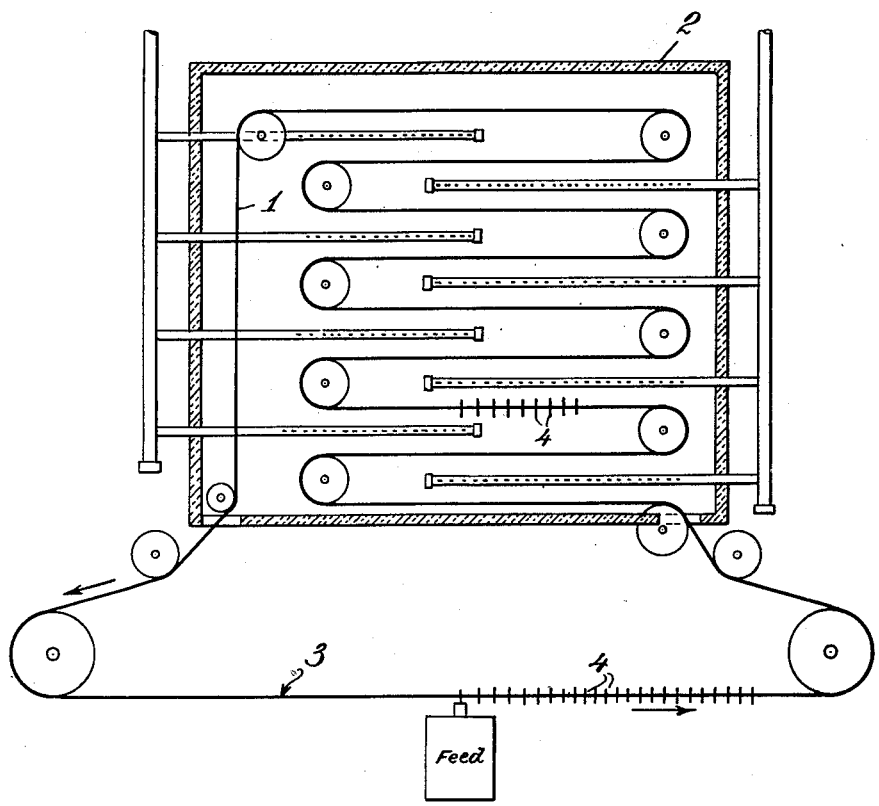
Fig. 8 is a diagrammatic view of the toasting oven and carrier shown as set up for the rapid production of the new product.

Referring to the drawings, 1 indicates a conveyor or carrier which as shown in Fig. 8 is a long endless chain having the greater part of its path of movement within the oven, indicated diagrammatically at 2, and a portion of its path of travel without the oven, as indicated at 3, in order to permit the slice of bread to be toasted to be fed to the chain and the completed product to be removed therefrom. In the machine as designed for large output under commercial conditions, automatic means are provided for removing the wrappers from returned bread and feeding the individual slices one at a time successively to the holding members indicated generally by the numeral 4 and which serve to carry the individual slices through the oven. Automatic means are also provided for removing the toasted products from the carriers as they emerge from the oven and before they reach the point at which the slices of bread are fed to the carrier. These various features are described and claimed in my copending application Serial No. 211,376, filed June 2, 1938. In the present application only so much of the machine will be shown and described as may be necessary to disclose the manner of performing the successive steps upon the bread as necessary to produce the improved product.

The carrier chain may be of any suitable construction. As shown, it is of the ordinary sprocket type and is arranged with the pivots of its links extending in a vertical plane so that the chain may be driven by horizontal sprocket wheels, that is, the sprocket wheels mounted on vertical axes. Supported at intervals on, say, every third link, are the carriers 4. These consist essentially of two upstanding arms each pivotally supported on a transverse horizontal pivot so as to swing toward and away from each other at their upper free ends through a limited arc, after the manner of a pair of tongs. The upstanding arms 5 and 6 may be attached to the carrier chain in any suitable manner, for example, as shown particularly in Fig. 3, there is provided a pair of clamping plates 7 which are clamped by transverse bolts to the opposite sides of the bars making up each third link of the sprocket. On the ends of the two lower clamping bolts which clamp the plates to the chain, are guide rollers 8 which extend between upper and lower guide tracks 9 and 10 respectively, as shown more particularly in Fig. 3. The guide tracks 9 and 10 are conveniently formed of angle members fixedly supported in proper relation to each other. As there are two guide rollers on each side, it is obvious that the plates 7 to which the arms 5 and 6 are pivoted, will be held against angular movement as the chain is carried through the oven. The tracks extend throughout the length of travel of the chain within the oven and are curved around the sprockets in such a manner as to continuously hold the arms 5 and 6 in upright position. The plates 7 project upwardly above the guide tracks to receive the transverse pivots 10' and 11 on which the arms 5 and 6 are respectively mounted.

The arm 5 is provided at the bottom with a rearwardly extending bracket 12 in which is mounted a cam roller 12a which runs along a cam track fixed to the upper surface of the angle 9 making up the guide track along one side of the path of movement of the carrier chain. Similarly, the arm 6 is provided with a forwardly extending arm 13 carrying a guide roller 14 which runs along a similar guide track carried by the other angle 9 at the opposite side of the path of travel of the chain. As will be apparent, changes in the contour of the upper edges of the guide tracks will cause the arms 5 and 6 to swing on their pivots toward and away from each other in any desired manner.

The arms 5 and 6 are provided at their upper ends with a pair of gripping members numbered 16 and 17, respectively. As shown, the gripping member 16 comprises a metal plate fixedly attached by bolts to the member 5 which, as shown, is preferably cut away to reduce the quantity of metal back of the bread-engaging plate or member 16. The plate 16 is convex on its face toward the plate 17 and is provided with scoring knives 18 arranged preferably in the pattern shown and projecting from the face of the plate a distance substantially equal to the distance between the members 16 and 17, when they are held in their closed or vertical positions as shown in Fig. 5.

The member 17 is preferably composed of a block or plate of any heat-insulating material such as asbestos or tiling, which is supported in spaced relation with the upper end of the member 6 in a manner to be adjustable with respect thereto so as to vary the space between the bread-holding plates when they are in closed position. This adjustment may be suitably provided by means of bolts 19 attached to the back of the plate 17 and projecting through holes in the member 6, whereby the plate 17 may be clamped against adjustment screws 20 set in the plate member 6, as more fully shown in Fig. 4. Cemented or otherwise secured to the face of the plate 17 is a flat metal plate 22 which provides a toasting surface for one side of the slice of bread. This plate 22 is provided with kerfs or grooves corresponding in pattern to the pattern of the scoring knives 18, and as shown in Fig. 5 the kerfs are wider than the thickness of the blades, whereby the bread will not be severed by the knives but instead a scoring will be produced which consists of a groove on one side substantially the full thickness of the piece of toast and on the other side an upstanding ridge. The ridge is very similar to the crease produced by first folding a sheet and then unfolding it, as distinguished from a mere cut-away or compressed scoreline.

The sprockets which support the carrier chain in the oven are preferably arranged so as to provide a back-and-forth travel of the chain across the width of the oven and between each two passages of the chain gas burners are arranged in the usual manner so as to maintain the oven uniformly heated at the desired temperature. The length of chain in the oven will of course be sufficient to secure the desired toasting of the bread with the chain running at a comparatively high speed. The cam tracks on the angles 9 which control the swinging movement of the arms 5 and 6 extend throughout the length of the passage of the conveyor through the oven, and are beveled at their ends so that the rollers 12a and 14 will ride up on the tracks as the bread holders enter the oven and will open as they leave the oven to permit the toast to cool before the holder reaches the point where the toast is ejected and the fresh slice of bread is inserted. The toast is held against dropping when the plates are opened by fingers 25 attached to the arms 5 and projecting through slots in the lower edges of the plates 16 and 17.

The plate 17 may be adjusted to give any desired degree of compression to the slice of bread. For example, if the bread is seven-sixteenths of an inch thick it can be compressed to seven-thirty-seconds at the edge and to five-thirty-seconds in the middle.

By compressing the middle of the slice to a greater extent than the edge a uniform degree of toasting and a uniform color is secured throughout the area of the slice. It is also desirable to provide a greater exposure of the plate 16 to the heat of the oven than the plate 17. Apparently the score knives 18 release the toast more readily than the grooves 19 for the toast remains in contact with the plate 17 until the plates reach the point of discharge, hence the toasting effected by the plate 16 must be completed during the passage of the holders through the oven while the toasting from the plate 17 continues for a longer period.

The procedure of compressing the bread while moist and then immediately toasting produces a different flavor and texture than when the bread is compressed and dried before toasting. Apparently the greater concentration of moisture produced by the compression of the bread produces a further cooking of the crumb of the bread which much improves the flavor of the toast.

The method of scoring the bread is also important. When the scores are produced by merely compressing the bread along the scorelines, the bread is toughened rather than being rendered more frangible and the toast is apt to break between rather than at the score lines. By projecting the score line beyond the median plane of the slice of bread, the tension produced by bending the slice is concentrated at the score line—like breaking a stick of wood across the knee—and the toast invariably breaks right along the score lines. This is important where the toast is broken before being served—for example when used for canapes.

I claim:

The method of toasting sliced bread without removing the crust which consists in compressing the slices of bread to reduce its thickness between two plates shaped to compress the entire middle portion of the slice within the periphery to a greater extent than the periphery, and then immediately thereafter applying heat to said plates for a period of time and at a temperature to completely toast the bread while so held between said plates.

LESTER NEUBERGER.